(12) United States Patent
Chong (10) Patent No.: US 8,118,286 B2
(45) Date of Patent: Feb. 21, 2012

(54) IMPACT ENERGY DISSIPATION DEVICE

(76) Inventor: Chin Wah Nyee Chong, Selangor Darul Ehsan (MY)

( * ) Notice: Subject to any disclaimer, the term of this patent is extended or adjusted under 35 U.S.C. 154(b) by 1046 days.

(21) Appl. No.: 11/660,145

(22) PCT Filed: Aug. 10, 2005

(86) PCT No.: PCT/IB2005/002581
§ 371 (c)(1),
(2), (4) Date: Jan. 11, 2008

(87) PCT Pub. No.: WO2006/018721
PCT Pub. Date: Feb. 23, 2006

(65) Prior Publication Data
US 2008/0238115 A1 Oct. 2, 2008

(30) Foreign Application Priority Data
Aug. 13, 2004 (MY) .............................. PI 20043304

(51) Int. Cl.
*B61G 11/12* (2006.01)
(52) U.S. Cl. ................... 267/116; 188/376; 293/133
(58) Field of Classification Search .............. 267/116, 267/139; 188/371–376, 377; 293/132, 133
See application file for complete search history.

(56) References Cited

U.S. PATENT DOCUMENTS

| 3,968,862 | A | * | 7/1976 | Gorges et al. | 188/376 |
| 4,426,109 | A | * | 1/1984 | Fike, Jr. | 293/133 |
| 4,823,923 | A | * | 4/1989 | Moyer | 188/376 |
| 4,929,008 | A |   | 5/1990 | Esfandiary |  |
| 5,829,310 | A |   | 11/1998 | DePaolis |  |

FOREIGN PATENT DOCUMENTS
DE 24 05 173 8/1975
* cited by examiner

*Primary Examiner* — Pamela Rodriguez
(74) *Attorney, Agent, or Firm* — Bacon & Thomas, PLLC (57) ABSTRACT

An impact energy dissipation device for the prevention of high-speed vehicles and more specifically automotive vehicles, aircraft, helicopters, components and the like from receiving high-speed impact energy directly onto their structures in case of a collision. The device is to isolate high-speed impact energy from the crashworthy structures by breaking down the huge impact energy with many small manageable shear fragments. The device includes a slidable assembly with a series of resistive pins with predetermined shear strength, staggered in two tandem rows to shear in a controlled manner that only one pin is sheared at a time thereof bearing an approximate equivalent of one shear pin load transmission throughout a collision.

15 Claims, 7 Drawing Sheets

DETAIL A

SECTION X-X

IMPACT ENERGY DISSIPATION DEVICE

FIELD OF INVENTION

This invention relates to an impact energy dissipation device for the prevention of high-speed vehicles and more specifically automotive vehicle, aircraft, helicopter, components and the like from receiving high-speed impact load directly onto the crash worthy structure in case of a collision.

BACKGROUND OF THE INVENTION

There are various methods available for protecting the safety of the automotive vehicles and their occupants. Most automobile makers focus on soft shell vehicle with crumple zone, surrounded by a hard core to provide a safety cell for the passengers. The crumple zone concept is to receive collision impact energy by deformation units which spread the energy out into the body structure. The present crumple zones are basically a space provided to receive the deformed and twisted structures in case of a high-speed collision, but without a special device, the magnitude of the damage and its maximum crumple distance are not ascertained before the crash. Therefore this method is not always reliable. Although this crumple zone method is presently in use, its capacity relies mainly on the strength of the body-shell and the body-shell relies mainly on its shape and ductility of its material, soft enough to deform and absorb the impact energy. As for the composite structures, especially the carbon based fiber composite this crumple zone concept is not possible. Most composites are not suitable because of its brittleness and exhibit non-progressive characteristics when fail.

In the aviation industry, airplanes are built with very high safety standards and governed by regulations from FAA and or local civil airworthiness authorities. In aviation, airplane safety standards are changing every day based on findings from past crashes and incidences. Meeting the new safety margin is the challenge the aircraft designers have to face.

For example, the 9 g barrier requirements for bulkhead, massive load of reinforcement are needed to restrain the 9 g bulkhead. In order to meet the requirements, almost every stringer in the fuselage and the floor beams within the vicinity has to be reinforced to share the additional load. With the huge concentrated load, the attachments are susceptible to fatigue and a smaller possibility that the stringers might rip off before the 9 g design load is met in the event of a crash.

For the case of passenger seat, the seat tracks are require to withstand from 9 g to 16 g, a 77.7% increase in its design load. So much so that the seat-track has to be made from stronger material such as titanium and the seat manufacturer has to beef up their seats to match.

The high-speed impact energy dissipation device is designed to meet the demand for higher safety margin, especially at the high load concentration points. For example, a 9 g requirement, the device may be configured to activate at the design load depending on the aircraft design requirement. With the invention, the 9 g attachments may have to bear only the predetermined g load: whereby the remaining energy may be absorbed by the device.

The device concept is to isolate the high-speed impact energy from the vehicle crashworthy structures to reduce the possible fatalities of their occupants in case of a high speed collision. The device is to isolate the high-speed impact energy by dissipating large impact energy into many small manageable fragments. This high-speed impact energy dissipation device is based on a simple design concept. It is also small in size, light weight, easily adaptable and cost effective.

The concept of the invention is based on stresses produce by shocks. In theory, it is stated that any elastic structure subjected to a shock will deflect until the product of the average resistance, developed by the deflection, and the distance through which it has been overcome, has reached a value equal to the energy of the shock. It follows that for a given shock, inversely proportional to the deflection. If the structure were perfectly rigid, the deflection would be zero, and the stress infinite. The effect of the shock is therefore, to a great extent dependent upon the elastic property of the structure subjected to the impact.

The energy of a body in motion if collided may be spent in each of the following conditions:
1. In deforming the body struck as a whole,
2. In deforming the moving body as a whole,
3. In partial deformation of both bodies on the surface of contact (most of this energy will be transformed into heat),
4. Part of the energy will be taken up by the structures, if these are not perfectly rigid and elastic.

The above conditions are applicable to a body in motion when it is involved in a collision. The nature of the impact may vary either in one or more than one of the above conditions.

The object of the present invention is to design a device to spend the impact energy into the forth condition by substituting the deformable body structures with the device.

The capacity of the device is based on Newton's Third Law of Motion, where the magnitude of the impact energy or the 'work done' is predetermined by the body-shell of the vehicle. Similarly, for the case of a helicopter, when dropped from a height, large potential impact energy may also be determined. With these conditions and their extreme impact forces, so far no single device is capable to absorb such an extreme magnitude without causing less fatality to the occupants.

SUMMARY OF THE INVENTION

The present object of the invention is to prevent vehicle and the like from receiving high-speed impact energy directly from the point of impact. A device is therefore invented to limit the huge impact energy from transmitting beyond the device by breaking down the impact energy into many small manageable fragments to improve the protection of its occupants. The device including a series of predetermined resistive pins staggered to from two rows evenly spaced and in tandem formation to adsorb the impact energy by shearing the pins individually in a manner only one pin is in contact and sheared at a time thus resisting only to an equivalent of one shear pin load.

Another object of the invention is to prevent a predetermined collapsible zone set to the limit for possible protection to the unsafe zone within the predetermined collision speed by pre-setting the amount and strength of the resistive element to determine the distance of the collapsible zone equal the g forces produced by the predetermined speed.

Another object of the invention is the arrangement of the resistive element in the form of shear pins enabling the device to receive the load by shearing its shear pins individually and repeatedly over a series of similar pins.

Another object of the invention is the configuration method designed to absorb very high shear forces within a very short displacement distance and by using material with consistent shear strength together with multiple shear path.

Another object of the invention is the simplicity of the device adaptable to most kinds of automotive vehicle, airframe, helicopters structures, components and the like without noticeable weight increase and protrusion.

Another object of the invention is the flexibility of the device to fit with predetermined shear value to suit the weight of the vehicle.

Another object of the invention is the design concept by using economically available standard approved material made from readily available parts.

Another object of the invention is the adaptability to different material for different application such as light-weight aluminum alloy or composite material for aircraft including high-end automobile application and heavier steel material for commercial and conventional vehicle.

BRIEF DESCRIPTION OF THE DRAWINGS

Other objects together with the foregoing are attached in the invention described in the accompanying description and illustrated in accompanying drawings, in which:—

DETAILED DESCRIPTION OF THE PREFERRED EMBODIMENTS

Figure 1:
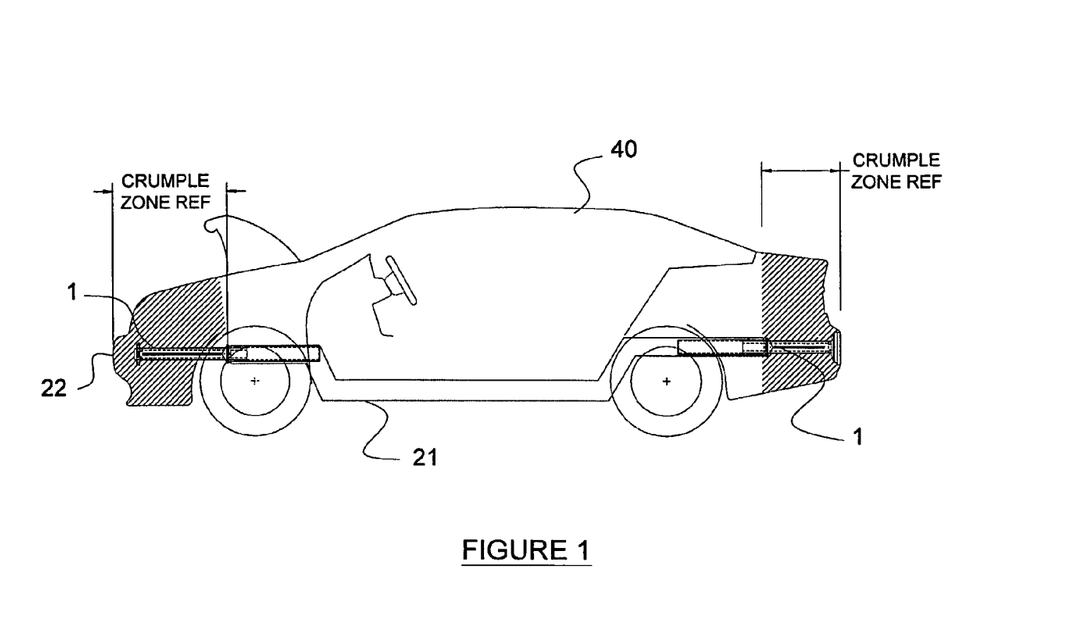
FIG. 1 shows a side view of the impact energy dissipation devices of the present invention mounted onto the front and rear ends of an automotive vehicle of the predetermined crumple zone.
Figure 2:
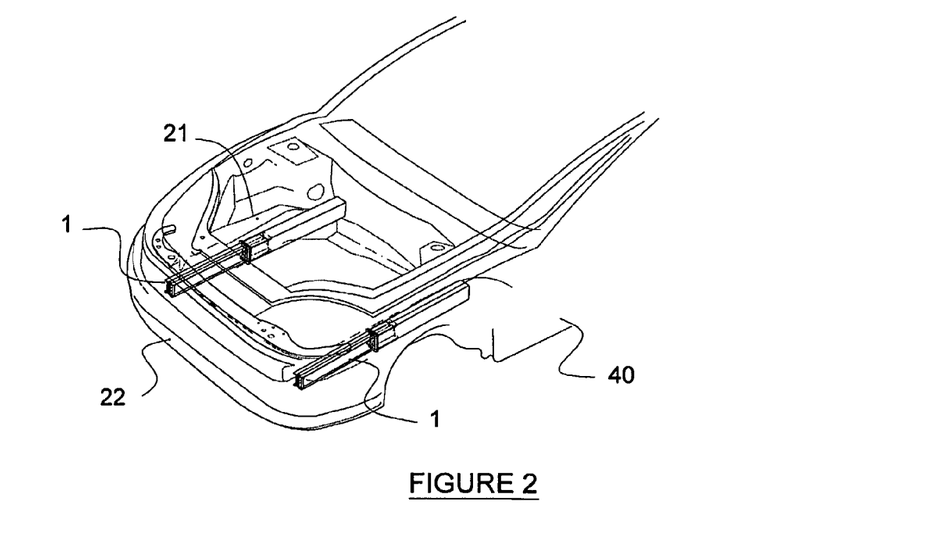
FIG. 2 is a partial perspective view of the front end of the automobile vehicle body-shell embedded with a pair of impact energy dissipation devices.

Referring to FIG. 1, reference numeral 1 designates, generally, a preferred embodiment of the impact energy dissipation devices which are mounted horizontally at preferably the front and rear ends within an automotive vehicle chassis (21) for dissipating the impact energy when a large impact force is applied onto the vehicle (40). The impact energy dissipation devices (1) are strategically positioned within the vehicle chassis (21) with consideration for the predetermined collapsible zones are mounted to form part of the vehicle (40). The front end of the automobile vehicle (40) can be mounted with a pair of the impact energy dissipation device (1) as shown in FIG. 2. The impact energy dissipation device (1) comprising a track assembly (2) includes a pair of guided tracks (2a) which is spaced apart forming a gap (41) therebetween, whereby the track assembly (2) is slidably attached with a shearing member (42) which includes a frame plate (42a) having a center aperture for slotting the track assembly (2) from the front end and at least one shear blade (42b) mounted perpendicular to the frame plate (42a) of the shearing member (42) whereby the shear blade (42b) is located in the gap (41) and sandwiched in between the guided tracks (2a) of the track assembly (2) when the impact energy dissipation device (1) is in an assembled position as shown in FIG. 8.

Figures 7, 8:
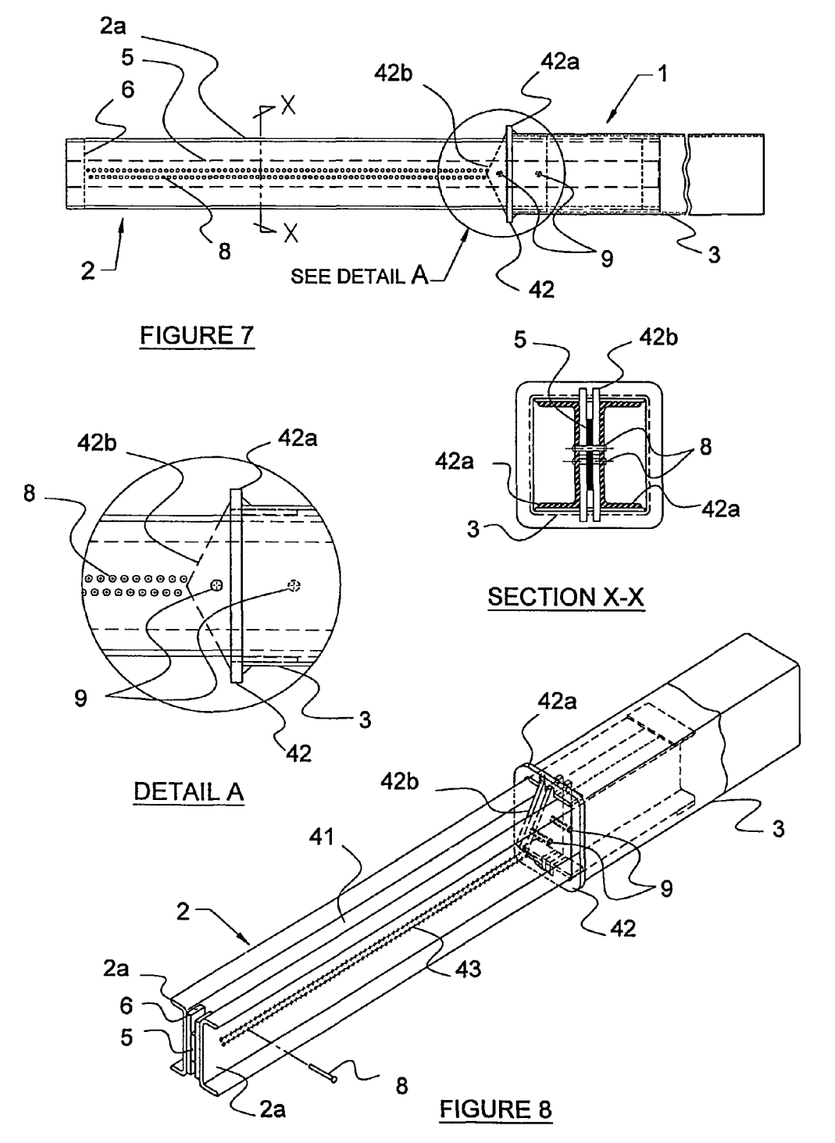
FIG. 7 is a side view of the impact energy dissipation device of the present invention with the details of the shear blade and a cross sectional view of the device.
FIG. 8 is a perspective elevation view of the impact energy dissipation device of FIG. 7.

The pair of guided tracks (2a) is formed with a series of aligned holes (43) along the guided tracks (2a) for accommodating a plurality of resistive sheer pins (8) which includes an elongate body mounted transversely therethrough as shown in FIG. 8. The shear blade (42b) is used for shearing the resistive sheer pins (8) on the guided tracks (2a) upon the application of impact force thereon. The device (1) is configured to absorb the impact energy by shearing the resistive pins (8) individually by the shear blade (42b) whereby only one resistive pin (8) is in contact and sheared at a time thus resisting only to an equivalent of one shear pin load. A mounting sleeve (3) is attached at the rear end of the shearing member (42) for axial movement upon an impact force applied thereto. The device (1) will collapse at predetermined distance until either all the impact energies are dissipated or all the resistive pins (8) are sheared. The shear blades (42b) are formed in arrowhead shape for dispersing sheared resistive pins (8) fragments away from the cutting edges of the shear blades (42b) to prevent congestion at pre-sheared resistive pins (8).

The shear value of the resistive pins (8) can be selected to suit the required weight, speed and collapsible distance of the vehicle (40). The required predetermined shear value may be selected from different resistive pin material and the value may be further enhanced by design configuration to provide more resistances when required. The impact energy dissipation device (1) may be mounted onto the chassis, body-shell, fuselage or airframe structures.

Figure 3:
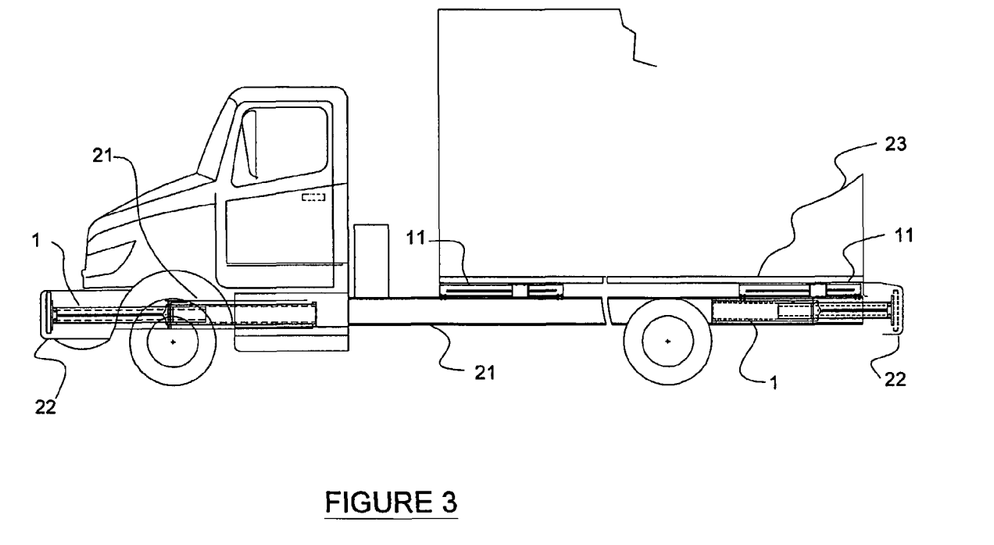
FIG. 3 shows a side view of the impact energy dissipation devices mounted onto the front and rear ends of a truck and the devices are also mounted between the chassis and the container structures of the truck.

The impact energy dissipation devices (1) are strategically positioned on the vehicle chassis (21) of a truck (44) with consideration for the predetermined collapsible zones are rigidly mounted to form part of the bumpers (22) to match the height of roadworthy vehicles in case of a collision with another vehicle or object as shown in FIG. 3. The impact energy dissipation devices (11) of another embodiment of the present invention are mounted between the vehicle chassis (21) and a container (23) as initial load retardant in case of a high-speed collision.

Figure 4:
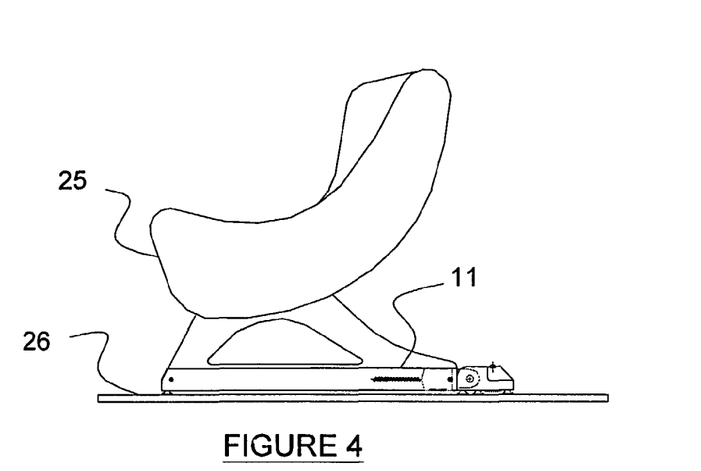
FIG. 4 shows a side view of the impact energy dissipation devices mounted onto an aircraft passenger seat and FIG. 4a and FIG. 4b show the possible crash behaviors of seats with and without the devices respectively.
Figure 4A:
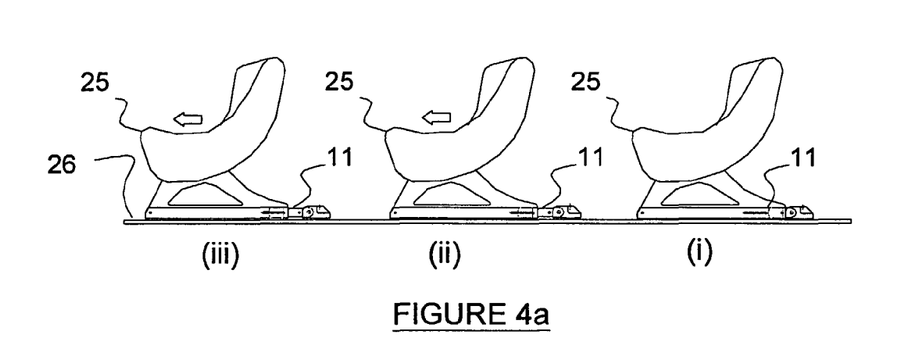
Figure 4B:
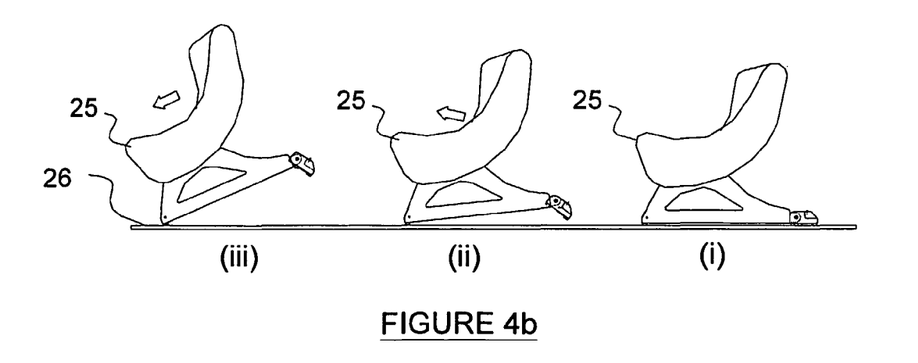

The second embodiment of the impact energy dissipation devices (11) form part of the 9 g or 16 g commercial aircraft passenger seat (25) is to isolate impact forces from transmitted directly onto the seat tracks (26) to provide higher safety margin in addition to the conventional design load of 9 g or 16 g factors in case of crash as shown in FIG. 4. The possible crash positions of the aircraft passenger seat (25) with the preinstalled impact energy dissipation device (11) and without the device (11) are shown in FIGS. 4a and 4b respectively. The passenger seat (25) without the device (11) installed at the seat tracks (26) will be easily took off from the floor when receiving high-speed impact energy in case of a collision.

Figure 5:
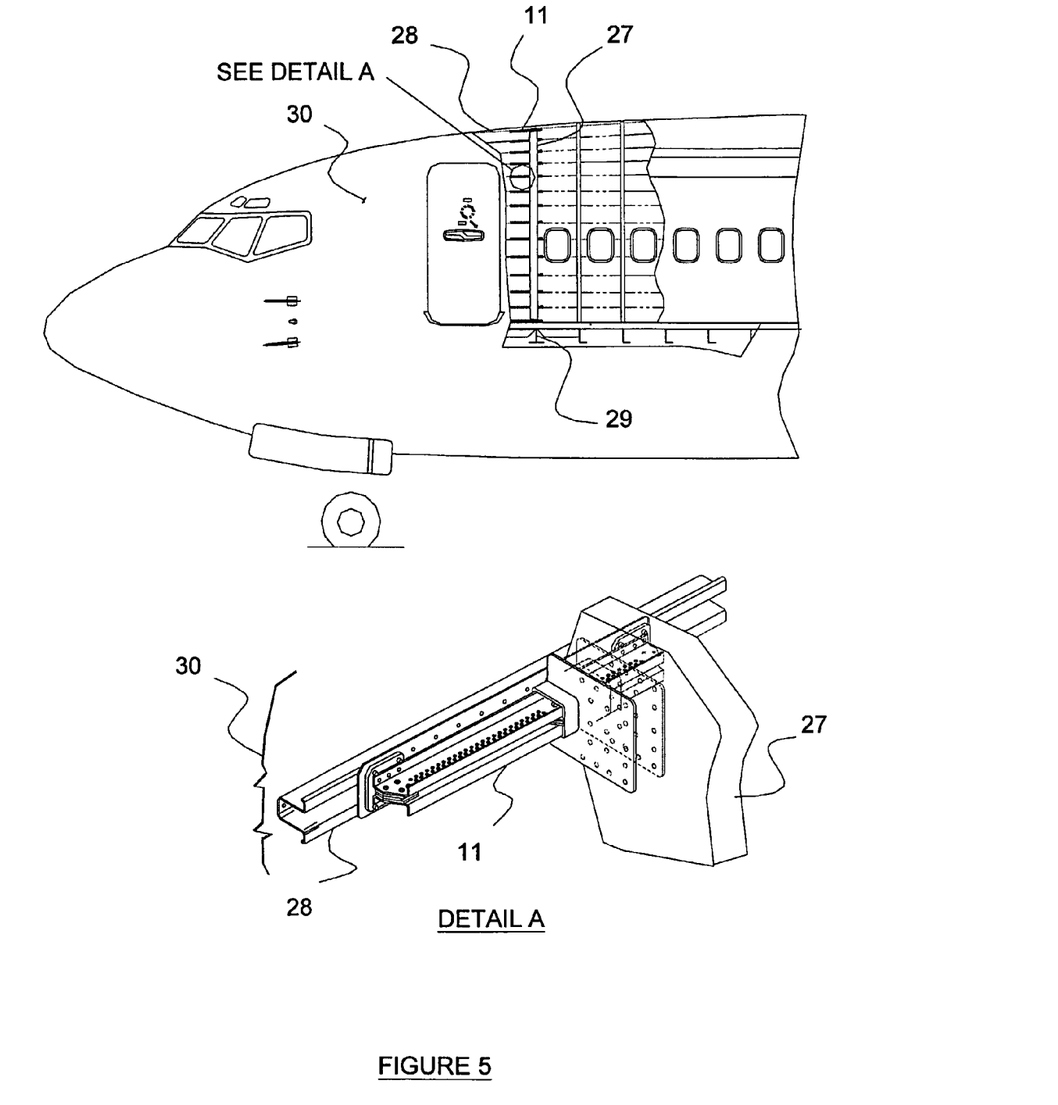
FIG. 5 shows a partial side elevation view of the impact energy dissipation devices mounted onto a cargo plane forward 9 g barrier bulkhead.

The 9 g bulkhead barrier (27) with the impact energy dissipation device (11) can be mounted onto the cargo aircraft floor beams (29) and fuselage stringers (28) in lieu of conventional brackets is to isolate the impact forces from being transmitted directly onto the fuselage (30) in the event of a crash as shown in FIG. 5.

Figures 6, 6A, 6B, 6C, 6D:
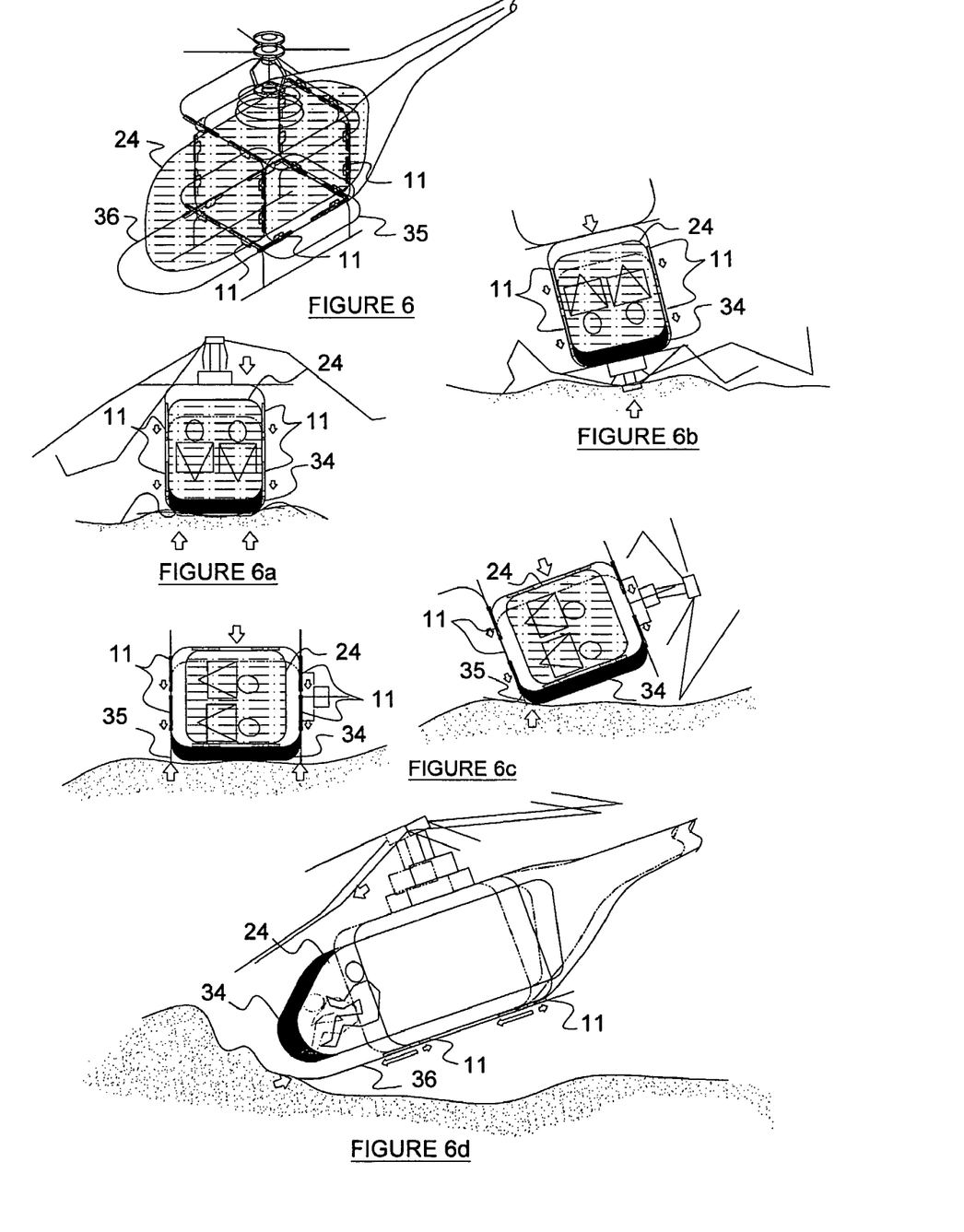
FIG. 6 shows perspective elevation view of the impact energy dissipation devices mounted onto different possible directional positions shown vertically at capsulated cabin, laterally at the side impact bars and lengthwise at the landing gear support structures.
FIG. 6a shows a front view of a helicopter with the impact energy dissipation devices dropped vertically to the ground.
FIG. 6b shows a front view of the helicopter with the impact energy dissipation devices dropped vertically and upside down.
FIG. 6c shows a front view of the helicopters with the impact energy dissipation devices dropped vertically on its side.
FIG. 6d shows a front view of the helicopter with the impact energy dissipation devices pitching onto the terrain.

In another application, the impact energy dissipation devices (11) are mounted onto a helicopter capsulated cabin (24), side impact bars (35) and landing gear support structures (36) for the reduction of shock by spreading over a predetermined collapsible distance (34) during a crash as shown in FIG. 6. FIG. 6a shows the helicopter with the impact energy dissipation devices dropped vertically to the ground, FIG. 6b shows the helicopter with the devices dropped vertically and up-side down, FIG. 6c shows the helicopters with the devices dropped vertically on its side and FIG. 6d shows the helicopter with the devices pitching onto the terrain.

FIG. 7 shows a preferred embodiment of the impact energy dissipation device (1) of the present invention. The series of aligned holes (43) provided at the guided tracks (2a) of the track assembly (2) are staggered in tandem arrangement which are arranged in two rows. Each aligned holes (43) of the pair of guided tracks (2a) is mounted with a resistive pin (8) which is to break by the shear blade (42b) upon receiving the raw impact energy. The entire raw impact energy from transmitting through the device (1) is restricted because only one pin (8) is resisting and breaks by the impact load at a time before the next pin (8) repeats the process. The track assembly (2) partially slides into the mounting sleeve (3) as shown in FIG. 7. The guided tracks (2a) is preferably a pair of C-shape tracks which is assembled back-to-back to each other as shown in the section X-X in FIG. 7. The device (1) further comprising a centre piece (5) having a series of corresponding holes (not shown) which are matching with the series of aligned holes (43) of the track assembly (2), whereby the centre piece is sandwiched in between the guided tracks (2a) of the track assembly (2). Spacers (6) may be added at the end of the track assembly (2) in between the guided tracks (2a) and the centre piece (5) for spacing the guided tracks apart. Gaps (41) are formed in between the guided track (2a) and the centre piece (5). The two series of resistive pins (8) are fitted through the guided tracks (2a) of the track assembly (2) and passed through the centre piece (5). A pair of shear blades (42b) whereby each is assembled between the guided track (2) and the centre piece (5). The shear blades (42b) of the shearing member (42) are held in place by fasteners (9) which holding the shear blades (42b) onto the mounting sleeve (3) as shown in FIGS. 7 and 8.

Figure 9:
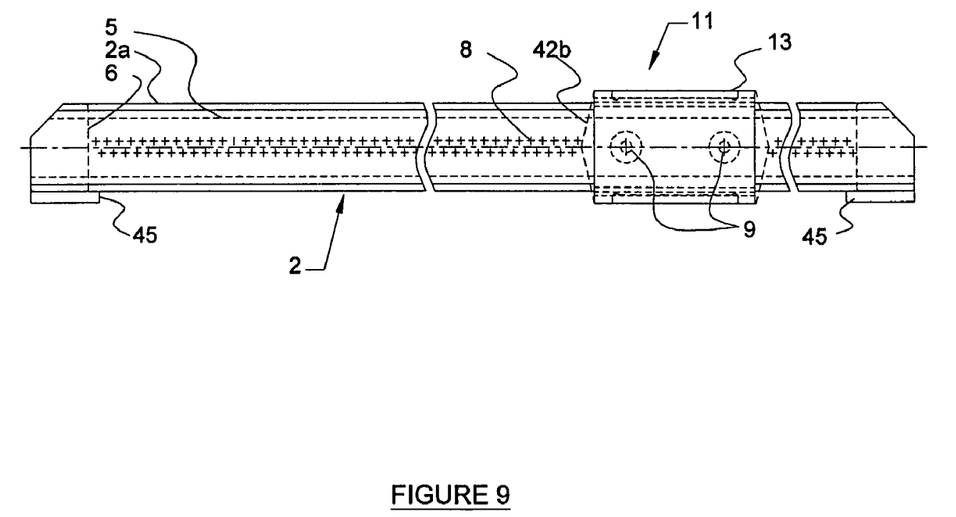
FIG. 9 is a side view of the other embodiment of the impact energy dissipation device configured for load isolation application as shown in FIGS. 3, 4, 5 and 6.

For the second embodiment of the present invention, the impact energy dissipation device (11) comprising a track assembly (2) includes a pair of guided tracks (2a) which slides into a carriage (13) as shown in FIG. 9. The carriage (13) includes a shear blade (42b) at each opposing ends of the carriage (13). The guided tracks (2a) are formed in C-shape tracks which are assembled back-to-back to each other sandwiching the centre piece (5) and spaced by the spacers (6) at each including two series of resistive pins (8) fitted though them. The shear blades (42b) are held in place by fasteners (9). A packer (45) at both ends of the lower flanges of the track assembly (2) provides the attachment points for mounting onto the crashworthy structures. The device (11) is primarily meant for forward and aft g isolation application. The track assembly (2) may be mounted onto a fixed structure at a first end for the impact receiving end to a second end attached with a mounting sleeve (3) mounted onto the impact receiving end or depending on its application. The impact energy dissipation devices (1, 11) are designed to resist the energies exerted by the vehicle. To acquire the required resistance, a series of multiple resistive pins (8) is used to isolate the energy. For example, if a 4 mm diameter resistive pin (8) is used, each pin may resist as much as 0.5 ton in a double shear. If 100 pieces of such resistive pins (8) are used, the total shear value may resist up to as much as 50 tons linearly.

As will be readily apparent to those skilled in the art, the present invention may easily be produced in other specific forms without departing from its spirit or essential characteristics. The present embodiments is, therefore, to be considered as merely illustrative and not restrictive, the scope of the invention being indicated by the claims rather than the foregoing description, and all changes which come within therefore intended to be embraced therein.

The invention claimed is:

1. An impact energy dissipation device comprising:
   a plurality of resistive pins, each of which includes an elongate body;
   a track assembly having a series of aligned holes provided along said track assembly for accommodating said plurality of resistive pins extending therethrough; and
   a shearing member slidably attached to said track assembly, wherein said shearing member includes a shear blade mounted adjacent said track assembly for shearing said resistive pins in a controlled manner so that each said resistive pin is sheared individually in sequence for dissipating the impact energy in case of a collision.

2. The impact energy dissipation device as claimed in claim 1, wherein: said series of aligned holes are staggered in tandem arrangement and are arranged in two rows to form a series that isolate of each said resistive pin for relieving stresses on crashworthy structures against a sudden surge of impact energy.

3. The impact energy dissipation device as claimed in claim 1, wherein: said track assembly includes a pair of guided tracks which are spaced apart forming a gap therebetween.

4. The impact energy dissipation device as claimed in claim 3, wherein: said device further comprising a centre piece having a series of corresponding holes which match with said series of aligned holes of said track assembly, wherein said centre piece is sandwiched in between said guided tracks to provide additional double shear resistance from the same amount of said resistive pins thus increasing the shear value of said device.

5. The impact energy dissipation device as claimed in claim 4, wherein: said device is provided with spacers mounted at the end of said track assembly in between of said guided tracks and said centre piece, thus forming gaps therebetween.

6. The impact energy dissipation device as claimed in claim 5, wherein said gaps in between said guided tracks and said centre piece are for receiving a pair of shear blades of said track assembly.

7. The impact energy dissipation device as claimed in claim 1, wherein said shearing member further comprises a frame plate having a center aperture for slotting said track assembly therethrough and said shear blade is mounted perpendicular to said frame plate.

8. The impact energy dissipation device as claimed in claim 7, wherein said shearing member is attached with a mounting sleeve for housing said track assembly when said track assembly is in a fully collapsed position.

9. The impact energy dissipation device as claimed in claim 8, wherein: said shearing member is secured onto said track assembly with fasteners arranged to break at a predetermined load which is lower than the design or ultimate load.

10. The impact energy dissipation device as claimed in claim 7, wherein: said shear blade is formed in arrowhead shape for dispersing sheared resistive pin fragments away from the cutting edges of said shear blade to prevent congestion at pre-sheared said resistive pins.

11. The impact energy dissipation device as claimed in claim 1, wherein said shearing member includes shear blades facing outwards at both opposing ends for attachment of a crashworthy member forming a carriage to slide upon attaining the predetermined impact load for shearing said resistive pins in a controlled manner where each said resistive pin is to be sheared individually in sequence.

12. The impact energy dissipation device as claimed in claim 11, wherein: said carriage is arranged to slide towards the forward or aft direction along said track assembly upon reception of forward or aft impact forces respectively.

13. The impact energy dissipation device as claimed claim 12, wherein: said carriage is positioned at a predetermined position along said track assembly to suit application requirement to facilitate the forward and aft impact forces.

14. The impact energy dissipation device as claimed claim 11, wherein: said device is may be mounted onto a fixed structure at a first end for the impact receiving end to a second end attached with a mounting sleeve for housing said track assembly when said track assembly is in a fully collapsed position.

15. The impact energy dissipation device as claimed claim 11, wherein: said track assembly is provided with a packer at each end of lower flanges of said track assembly to provide attachment points for mounting onto a crashworthy structure.

* * * * *